(12) United States Patent
Fuhrer

(10) Patent No.: US 11,117,479 B2
(45) Date of Patent: Sep. 14, 2021

(54) TEMPERATURE-MONITORED CHARGING SYSTEM FOR TRANSMITTING ELECTRIC CHARGE CURRENTS

(71) Applicant: PHOENIX CONTACT E-MOBILITY GMBH, Schieder-Schwalenberg (DE)

(72) Inventor: Thomas Fuhrer, Blomberg (DE)

(73) Assignee: PHOENIX CONTACT E-MOBILITY GMBH, Schieder-Schwalenberg (DE)

(*) Notice: Subject to any disclaimer, the term of this patent is extended or adjusted under 35 U.S.C. 154(b) by 252 days.

(21) Appl. No.: 16/341,546

(22) PCT Filed: Oct. 16, 2017

(86) PCT No.: PCT/EP2017/076275
§ 371 (c)(1),
(2) Date: Apr. 12, 2019

(87) PCT Pub. No.: WO2018/069542
PCT Pub. Date: Apr. 19, 2018

(65) Prior Publication Data
US 2019/0375309 A1 Dec. 12, 2019

(30) Foreign Application Priority Data
Oct. 14, 2016 (DE) .......................... 102016220110.7

(51) Int. Cl.
*B60L 53/16* (2019.01)
*B60L 53/62* (2019.01)
(Continued)

(52) U.S. Cl.
CPC .............. *B60L 53/16* (2019.02); *B60L 53/18* (2019.02); *B60L 53/302* (2019.02); *B60L 53/62* (2019.02);
(Continued)

(58) Field of Classification Search
CPC .... B60L 53/14; B60L 53/16; B60L 2240/545; B60L 53/18; B60L 53/66; B60L 53/60;
(Continued)

(56) References Cited

U.S. PATENT DOCUMENTS 8,232,763 B1 * 7/2012 Boot .......................... H02J 3/14
320/107
8,723,477 B2 * 5/2014 Gaul ...................... B60L 3/0069
320/109

(Continued)

FOREIGN PATENT DOCUMENTS

DE 102009034886 A1 2/2011
DE 102011051052 A1 12/2012
(Continued)

*Primary Examiner* — Helen Rossoshek
(74) *Attorney, Agent, or Firm* — Occhiuti & Rohlicek LLP

(57) ABSTRACT

A charging system for transmitting an electric charging current to an energy receiver including: a charging plug for coupling to a corresponding connecting apparatus; an electronic control device; and at least one temperature sensor for determining a temperature of a current-carrying component of the charging system. The temperature sensor is coupled to the electronic control device for outputting temperature measurement data which represents the temperature of the current-carrying component. The charging system further has an ambient temperature sensor for determining an ambient temperature of the charging system and is coupled to the electronic control device. The electronic control device is designed to ascertain a differential temperature between the temperature of the current-carrying component and the ambient temperature based on the temperature measurement data and the ambient temperature measurement data and to output a control signal for the purpose of controlling the charging current based on the ascertained differential temperature.

9 Claims, 2 Drawing Sheets

Figure 1:
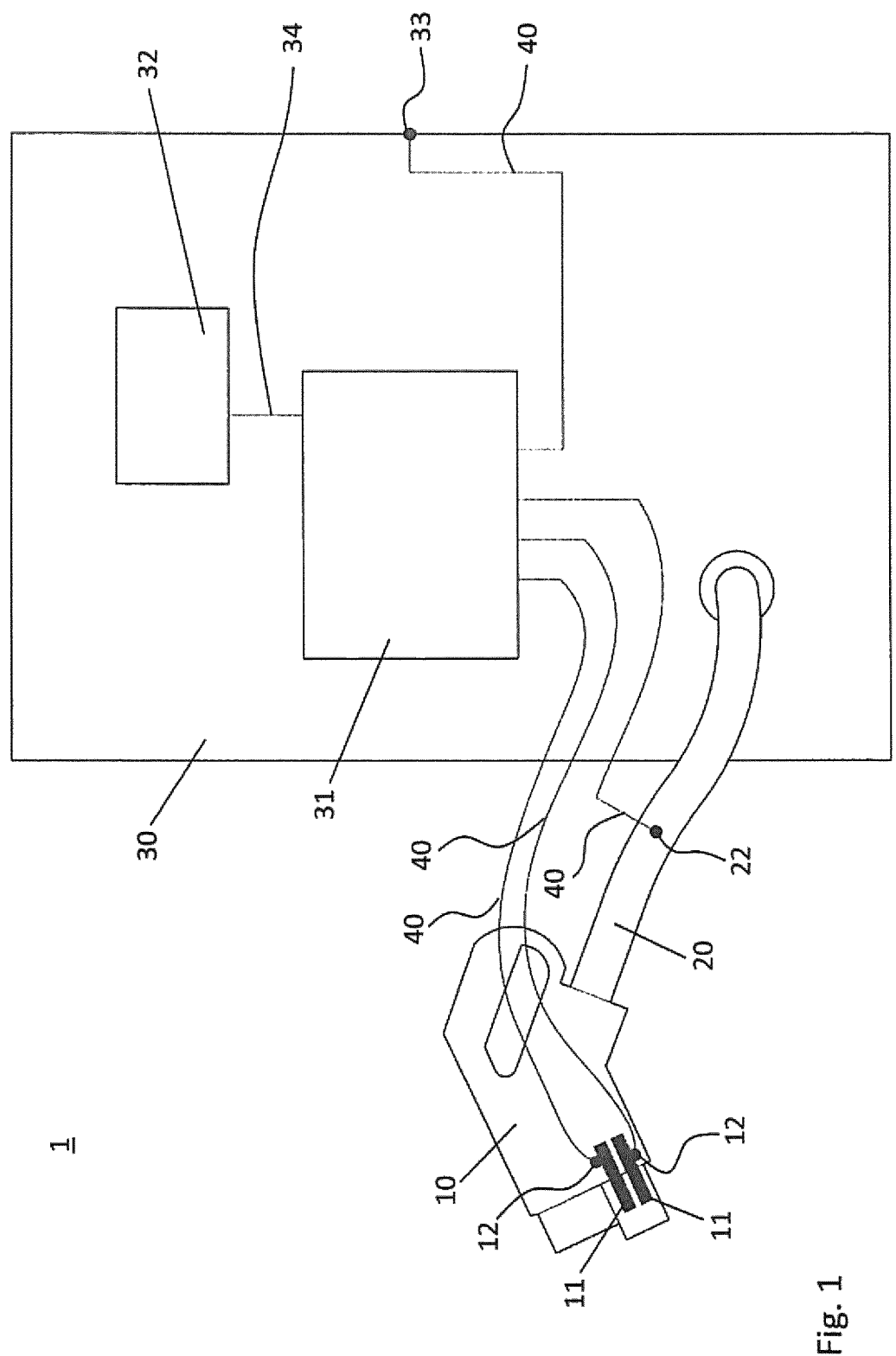

(51) Int. Cl.
*H01R 13/66* (2006.01)
*B60L 53/68* (2019.01)
*B60L 53/18* (2019.01)
*B60L 53/302* (2019.01)
*H02J 7/00* (2006.01)

(52) U.S. Cl.
CPC .......... *B60L 53/68* (2019.02); *H01R 13/6683* (2013.01); *H02J 7/0029* (2013.01)

(58) Field of Classification Search
CPC ................. B60L 2240/36; B60L 58/26; H02J 7/007192; H02J 2310/48; H02J 50/80; H02J 7/00309; Y02T 90/12; Y02T 90/16; Y02T 10/72
See application file for complete search history.

(56) References Cited

U.S. PATENT DOCUMENTS

| | | | | |
|---|---|---|---|---|
| 9,007,020 | B2* | 4/2015 | Prosser | B60L 53/57 320/109 |
| 9,211,801 | B2* | 12/2015 | Akai | B60L 53/11 |
| 9,308,911 | B2* | 4/2016 | Kohlberger | B60L 1/08 |
| 9,421,875 | B1* | 8/2016 | Flack | H02J 7/0026 |
| 10,195,954 | B2* | 2/2019 | Becker | B60L 53/14 |
| 2011/0181294 | A1 | 7/2011 | Ziegler | |
| 2012/0294332 | A1 | 11/2012 | Monks et al. | |
| 2014/0049206 | A1* | 2/2014 | Sridhar | B60L 11/1811 320/101 |
| 2014/0184165 | A1* | 7/2014 | Takahashi | H01M 10/48 320/134 |
| 2015/0303737 | A1 | 10/2015 | Steinbuchel et al. | |
| 2016/0107530 | A1* | 4/2016 | Roberts | H01R 13/6683 320/109 |
| 2017/0213951 | A1* | 7/2017 | Kim | H02J 7/0072 |
| 2018/0297473 | A1* | 10/2018 | Helnerus | H02J 7/0029 |
| 2018/0304757 | A1* | 10/2018 | Vaughan | B60L 53/14 |
| 2019/0326762 | A1* | 10/2019 | Zoon | B60L 53/302 |

FOREIGN PATENT DOCUMENTS

| | | | |
|---|---|---|---|
| DE | 102012105774 B3 | 10/2013 | |
| DE | 102012107902 A1 | 3/2014 | |
| DE | 102014111185 A1 | 2/2016 | |
| EP | 2555375 A1 | 2/2013 | |
| EP | 2765671 A1 | 8/2014 | |
| EP | 2819265 A1 | 12/2014 | |
| WO | WO-2014161803 A2 * | 10/2014 | ............ B60L 3/0023 |

* cited by examiner

TEMPERATURE-MONITORED CHARGING SYSTEM FOR TRANSMITTING ELECTRIC CHARGE CURRENTS

CROSS-REFERENCE TO RELATED APPLICATIONS

This application is the US National Stage of International Application No. PCT/EP2017/076275, filed on Oct. 16, 2017, which claims the priority of German Application No. 10 2016220110.7 filed on Oct. 14, 2016.

The present invention relates to a charging system for transmitting an electric charging current to an energy receiver comprising a temperature monitoring arrangement. In particular, the present invention relates to a charging system for transmitting an electric current to a vehicle which can be electrically driven.

The prior art discloses charging systems comprising plug-in connectors or charging plugs for vehicles which can be electrically driven, which plug-in connectors or charging plugs are designed for connection to a corresponding connecting apparatus which is designed, for example, as a charging socket. Reference is made to the charging plugs disclosed in DE 10 2012 105 774 B3 in this respect. Power contacts by means of which electric charging currents can be transmitted to an electrical energy receiver, for example a rechargeable battery of a vehicle, are arranged in the charging plug. The power contact is designed for electrical connection to an electrical energy source, for example a charging station or in general to an electrical power supply system. To this end, the power contacts are each permanently connected to a charging line.

On account of charging currents flowing through the power contacts, the power contacts inevitably heat up due to ohmic current heat losses. However, heating up of the power contacts is limited to a limit increase in temperature. For example, according to standard IEC 62196-3, the limit increase in temperature is limited to 50 K. This in turn leads to a maximum charging current of up to 200 A continuous load given largely standardized plug-in connector geometries. Charging currents of up to 400 A can be realized in cooled systems in which the power contacts and/or the charging cables are cooled.

In order to avoid overheating of the plug-in connectors, it is known from the prior art to provide plug-in connectors with temperature sensors. Said temperature sensors monitor the temperature of the plug-in connector. As soon as the temperature exceeds a defined limit value, the charging process is interrupted or the charging current is reduced by means of a monitoring electronics system by outputting a control signal or a plurality of control signals.

For example, DE 10 2009 034 886 A1 describes a plug-in apparatus for a charging cable for connecting an electric vehicle to a charging station. Here, the plug-in apparatus comprises a housing and electrical contacts, which are associated with the housing, for connection to a connection device in the charging station or in the electric vehicle. In addition, a temperature detection means which is in the form of a thermistor is provided in the housing, wherein the temperature in the housing can be evaluated by means of the temperature detection means.

The present invention is based on the object of providing a charging system for transmitting an electric charging current to an energy receiver, which charging system is matched to the environmental conditions of the charging system in an improved manner, so that erroneous disconnections of the charging system are avoided or at least reduced.

The object on which the present invention is based is achieved by a charging system having the features of claim 1.

Advantageous embodiments of the charging system are described in the dependent claims.

More precisely, the object on which the present invention is based is achieved by a charging system for transmitting an electric charging current to an energy receiver, wherein the charging system has a charging plug for coupling to a corresponding connecting apparatus, an electronic control device, and at least one temperature sensor for determining a temperature of a current-carrying component of the charging system, wherein the temperature sensor is coupled to the electronic control device for the purpose of outputting temperature measurement data which represents the temperature of the current-carrying component. The charging system according to the invention is characterized in that the charging system further has an ambient temperature sensor for determining an ambient temperature of the charging system, which ambient temperature sensor is coupled to the electronic control device for the purpose of outputting ambient temperature measurement data which represents the ambient temperature of the charging system. Furthermore, the electronic control device is designed to ascertain a differential temperature between the temperature of the current-carrying component and the ambient temperature based on the temperature measurement data and the ambient temperature measurement data and to output a control signal for the purpose of controlling the charging current based on the ascertained differential temperature.

By means of the charging system according to the invention, ambient temperatures of the charging system are taken into account when determining whether a control signal for controlling or regulating the charging current is output. Consequently, the charging system according to the invention prevents an impermissible increase in temperature in a current-carrying component remaining unnoticed in very cold environments in which the current-carrying components are likewise at a low temperature at the beginning of a charging process.

Furthermore, the charging system according to the invention prevents purported overheating and therefore a fault in the charging system being prematurely assumed in warm environments in which the current-carrying components are likewise at an elevated temperature at the beginning of a charging process. Furthermore, fluctuations in the ambient temperature, as occur over the course of a day and over the course of a year depending on the time of year, can be taken into account by means of the charging system according to the invention.

Consequently, in the charging system according to the invention, it is assumed and presupposed that impermissible heating of the current-carrying components does not occur in the case of an intact charging system in which the current-carrying components of the charging system consequently function as intended. In other words, it is assumed that impermissible heating of a current-carrying component is caused by a suddenly occurring fault or by gradual wear. Consequently, heating of a current-carrying component outside prespecified limits is not an allowed operating state.

The energy receiver is preferably a rechargeable battery and/or a car battery for driving a motor vehicle.

The connecting apparatus can preferably be designed as a charging socket of a motor vehicle.

The temperature sensor and/or the ambient temperature sensor are/is preferably coupled to the electronic control device by means of an electrical connection (for example by means of a wire) and/or wirelessly by means of radio.

Rapid disconnection of the charging system and/or charging current limiting is/are preferably performed by means of the control signal/the control signals which is/are output by the electronic control device. Furthermore, servicing instructions can preferably be output depending on the control signals.

The differential temperature is preferably ascertained during an overall charging operation of the charging system.

The charging system is preferably designed in such a way that the electronic control device is designed to output a control signal for the purpose of controlling the charging current when a prespecified limit differential temperature is exceeded by the differential temperature.

The correspondingly designed charging system has the advantage that the limit differential temperature can be determined in advance before the charging system is put into operation. The charging system usually does not exhibit any defects before the charging system is put into operation.

The prespecified limit differential temperature is preferably stored in the electronic control device and/or in a memory device which is connected to the electronic control device for the purpose of interchanging electronic data. For example, the limit differential temperature can be determined during a patterning process, in which the charging system is preferably tested at different ambient temperatures after having been produced, and stored in the electronic control device or the memory device. The limit differential temperature can preferably also be determined as part of a simulation of the charging system and stored in the electronic control device or the memory device.

The charging system is preferably designed in such a way that the charging system further has a memory device which is connected to the electronic control device for the purpose of interchanging electronic data.

The correspondingly designed charging system has the advantage that, in addition or as an alternative to the limit differential temperature, further data which is relevant for checking the charging system can also be stored.

The charging system is further preferably designed in such a way that a large number of limit differential temperatures which are associated with different ambient temperatures in each case are stored in the memory device, wherein the electronic control device is designed to compare the differential temperature with the limit differential temperature which is associated with the ascertained ambient temperature and to output the control signal for the purpose of controlling the charging current when the limit differential temperature is exceeded by the differential temperature.

The limit differential temperatures which are associated with different ambient temperatures in each case can be stored, for example, in a table of the electronic memory device. By way of example and in a non-limiting manner, a limit differential temperature of 30° C. can be stored given an ambient temperature of between 0° C. and 5° C. Further by way of example and in a non-limiting manner, a limit differential temperature of 35° C. can be stored given an ambient temperature of between 6° C. and 10° C. When a differential temperature of 33° C. is ascertained in a corresponding and exemplary table given an ambient temperature of 4° C., a control signal for the purpose of controlling the charging current is output by the electronic control device. Furthermore, when a differential temperature of 38° C. is ascertained in a corresponding and exemplary table given an ambient temperature of 8° C., a control signal for the purpose of controlling the charging current is output by the electronic control device.

The charging system is preferably designed in such a way that a setpoint time profile of the differential temperature which is associated with a time profile of the charging current is stored in the memory device, wherein the electronic control device is designed to store a time profile of the differential temperature during a charging process, to compare the time profile of the differential temperature with the setpoint time profile of the differential temperature, and to output the control signal for the purpose of controlling the charging current when the setpoint profile of the differential temperature is exceeded by the profile of the differential temperature by a prespecified amount.

The correspondingly designed charging system has the advantage that it has a lower susceptibility to erroneous measurements. Furthermore, the correspondingly designed charging system has a lower susceptibility to unnecessary disconnection/reduction of the charging current when, for example, the limit differential temperature is exceeded only over a short period of time during the charging process.

The charging system is preferably designed in such a way that a large number of setpoint time profiles of the differential temperature which are associated with different ambient temperatures in each case and with a time profile of the charging current in each case are stored in the memory device, wherein the electronic control device is designed to store a time profile of the differential temperature during a charging process, to compare the time profile of the differential temperature with the setpoint time profile of the differential temperature which is associated with the ambient temperature, and to output the control signal for the purpose of controlling the charging current when the setpoint profile of the differential temperature which is associated with the ambient temperature is exceeded by the profile of the differential temperature by a prespecified amount.

The correspondingly designed charging system has the advantage that it once again has a lower susceptibility to erroneous measurements. Furthermore, the correspondingly designed charging system once again has a lower susceptibility to unnecessary disconnection/reduction of the charging current when, for example, the limit differential temperature is exceeded only over a short period of time during the charging process.

The charging system is further preferably designed in such a way that the electronic control device is designed to store a large number of differential temperature profiles, which are ascertained during charging processes, in the memory device, wherein the differential temperature profiles are each associated with an ambient temperature which is measured during the respective charging process and with a profile of the respective charging current. Furthermore, the electronic control device is designed to ascertain average differential temperatures which are associated with respective ambient temperatures and respective charging current profiles based on the stored differential temperature profiles, and to compare the differential temperature with the average differential temperature which is associated with the ascertained ambient temperature and the ascertained profile of the charging current, and to output the control signal for the purpose of controlling the charging current when the average limit differential temperature is exceeded by the differential temperature.

The correspondingly designed charging system has the advantage that a history of the temperatures of the current-carrying components is taken into account when determining the limit differential temperatures.

The charging system is preferably designed in such a way that the at least one current-carrying component is a power contact of the charging plug.

In particular, the power contacts of the charging plug are subject to a high increase in temperature during a charging process, so that measurement of the temperature of the power contacts results in increased operational reliability of the charging system.

The charging system is further preferably designed in such a way that the charging system has a charging cable with at least two charging lines which are arranged within the charging cable, wherein the at least one current-carrying component is a charging line of the charging cable.

The charging lines are also subject to a high increase in temperature during a charging process, so that measurement of the temperature of the charging lines results in increased operational reliability of the charging system.

The charging system is preferably designed in such a way that the ambient temperature sensor is arranged on an outer side of the charging plug.

In particular, the ambient temperature sensor can be arranged in the region of a grip of the charging plug. The outer side of the charging plug usually experiences only a slight increase in temperature during a charging process, so that the ambient temperature can be reliably determined when the ambient temperature sensor is correspondingly attached to the charging plug.

The charging system is further preferably designed in such a way that it has a charging station which is electrically coupled to the charging plug, wherein the ambient temperature sensor is arranged on the charging station.

The charging station does not experience an increase in temperature or experiences only a slight increase in temperature during a charging process, so that the ambient temperature can be reliably determined when the ambient temperature sensor is correspondingly attached to the charging station.

Further advantages, details and features of the invention can be found below in the described exemplary embodiment.

IN THE DRAWINGS

FIG. 1: shows a schematic design of a charging system according to the invention for transmitting an electric charging current to an energy receiver.

Figure 2:
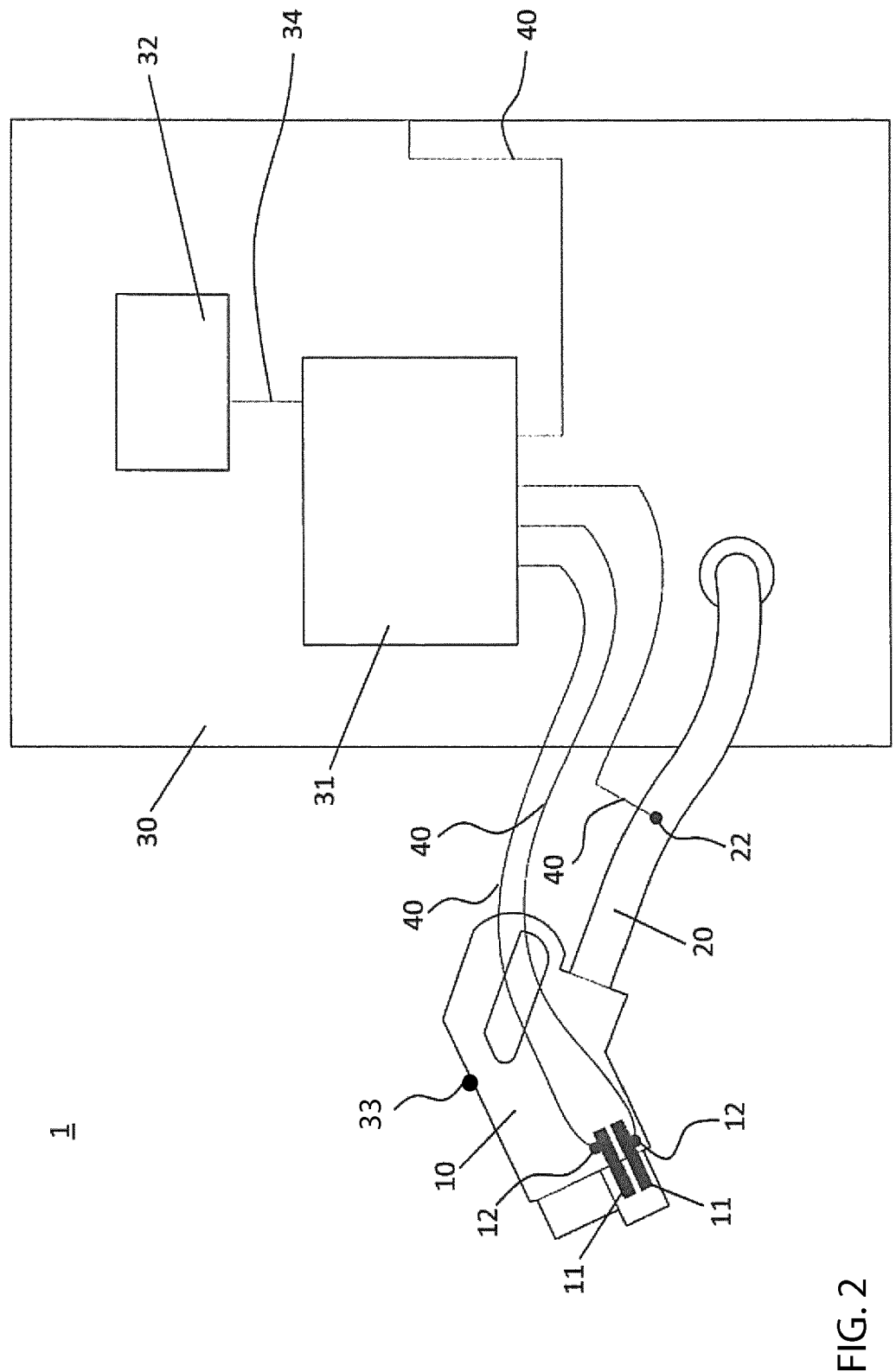

FIG. 2: shows a schematic design of an alternative embodiment of a charging system according to the invention for transmitting an electric charging current to an energy receiver.

FIG. 1 shows a charging system 1 according to the invention for transmitting an electric charging current to an energy receiver. The energy receiver can be, for example, a rechargeable battery and/or a car battery for driving a motor vehicle. It can be seen that the charging system 1 has a charging plug 10 for coupling to a corresponding connecting apparatus. The connecting apparatus can be, for example, a charging socket of a motor vehicle. It can further be seen in FIG. 1 that two current-carrying components 11 in the form of power contacts 11 are arranged in a front region of the charging plug 10. The power contacts 11 are, although not illustrated in FIG. 1, electrically connected to charging lines of a charging cable 20. The charging cable 20 in turn is electrically coupled to a charging station 30. The charging system 1 according to the invention further comprises an electronic control device 31 which is arranged within the charging station 30 in the illustrated exemplary embodiment.

The charging system 1 has a plurality of temperature sensors 12, 22 which are designed to determine a temperature of a current-carrying component 11, 20 of the charging system 1. First temperature sensors 12 are each designed for determining a temperature of the power contacts 11. To this end, the first temperature sensors can preferably be in direct contact with the respective power contacts in 11.

A second temperature sensor 22 is designed for determining a temperature of the charging cable 20. More precisely, the second temperature sensor 22 can be designed to determine a temperature of charging lines which run within the charging cable 20. The charging lines are not illustrated in FIG. 1.

The charging system 1 according to the invention further has an ambient temperature sensor 33 which is designed for determining an ambient temperature of the charging system 1. In the illustrated exemplary embodiment, the ambient temperature sensor 33 is arranged on the charging station 30. However, the present invention is not restricted to a corresponding arrangement of the ambient temperature sensor 33.

As an alternative and/or in addition, the ambient temperature sensor 33 can also be arranged on an outer side of the charging plug 10 (see FIG. 2).

The first temperature sensors 12 are coupled to the electronic control device 31 for outputting temperature measurement data which represents the respective temperatures of the power contacts 11. Here, in the illustrated exemplary embodiment, this coupling is performed by means of data lines 40 which allow data interchange between the first temperature sensors 12 and the electronic control device 31. However, the present invention is not restricted to a corresponding wired data coupling between the first temperature sensors 12 and the electronic control device 31 since a data coupling can, for example, also be made wirelessly by means of radio. The second temperature sensor 22 is also coupled to the electronic control device 31 for the purpose of outputting temperature measurement data which represents the temperature of the charging cable 20 and, respectively, of the charging lines within the charging cable 20. Here, in the illustrated exemplary embodiment, this coupling is likewise made by means of a data line which allow data interchange between the second temperature sensor 22 and the electronic control device 31. However, the present invention is not restricted to a corresponding wired data coupling between the second temperature sensor 22 and the electronic control device 31 since a data coupling can, for example, also be made wirelessly by means of radio.

The ambient temperature sensor 33 is also electronically coupled to the electronic control device 31 by means of a data line 40 for the purpose of outputting ambient temperature measurement data. In the illustrated exemplary embodiment, the data line 40 is embodied to be wired. However, the present invention is not restricted to a corresponding data line 40 since the data line 40 can also be made wirelessly, for example by means of radio, between the ambient temperature sensor 33 and the electronic control device 31.

The electronic control device 31 is designed to ascertain a differential temperature between the temperature of the current-carrying component 11, 20 and the ambient temperature based on the temperature measurement data and the ambient temperature measurement data and to output a control signal for the purpose of controlling the charging current based on the ascertained differential temperature. More precisely, the electronic control device 31 is designed to ascertain a differential temperature (which corresponds to a difference between the temperature of the power contacts 11 and the ambient temperature) based on the temperature measurement data, which is transmitted to the electronic control device 31 by the first temperature sensors 12, and based on the ambient temperature measurement data, which is transmitted to the electronic control device 31 by the ambient temperature sensor 33. In addition or as an alternative, the electronic control device 31 is designed to ascertain a differential temperature (which corresponds to a difference between the temperature of the charging cable 20 and the ambient temperature) based on the temperature measurement data, which is transmitted to the electronic control device 31 by the second temperature sensor 22, and based on the ambient temperature measurement data, which is transmitted to the electronic control device 31 by the ambient temperature sensor 33. The electronic control device 31 then outputs a control signal for the purpose of controlling the charging current based on the ascertained differential temperature. For example, the electronic control device 31 is designed to output a control signal for the purpose of controlling the charging current when a prespecified limit differential temperature is exceeded by the differential temperature.

It can further be seen in FIG. 1 that the charging system 1 further has a memory device 32 which is connected to the electronic control device 31 for the purpose of interchanging electronic data. The connection between the memory device 32 and the electronic control device 31 is made by means of a data line 34.

A large number of limit differential temperatures which are associated with different ambient temperatures in each case can be stored in the memory device 32, wherein the electronic control device 31 is then designed to compare the differential temperature with the limit differential temperature which is associated with the ascertained ambient temperature and to output of the control signals for the purpose of controlling the charging current when the limit differential temperature is exceeded by the differential temperature.

As an alternative or in addition, a setpoint time profile of the differential temperature which is associated with a time profile of the charging current is stored in the memory device 32. The electronic control device 31 is then designed to store a time profile of the differential temperature during a charging process and to compare the time profile of the differential temperature with the setpoint time profile of the differential temperature, wherein the control signal for the purpose of controlling the charging current is output when the setpoint profile of the differential temperature is exceeded by the profile of the differential temperature by a prespecified amount.

As an alternative or in addition, a large number of setpoint time profiles of the differential temperature which are associated with different ambient temperatures in each case and with a time profile of the charging current in each case are stored in the memory device 32. The electronic control device 31 is then designed to store a time profile of the differential temperature during a charging process and to compare this time profile of the differential temperature with the setpoint time profile of the differential temperature which is associated with the ambient temperature. The electronic control device 31 then outputs the control signal for the purpose of controlling the charging current when the setpoint profile of the differential temperature which is associated with the ambient temperature is exceeded by the profile of the differential temperature by a prespecified amount.

As an alternative or in addition, the electronic control device 31 is designed to store a large number of differential temperature profiles, which are ascertained during charging processes, in the memory device 32, wherein the differential temperature profiles are each associated with an ambient temperature which is measured during the respective charging process and with a profile of the respective charging current. The electronic control device 31 is designed to ascertain average differential temperatures which are associated with respective ambient temperatures and respective charging current profiles based on the stored differential temperature profiles. The electronic control device 31 then compares the differential temperature with the average differential temperature which is associated with the ascertained ambient temperature and the ascertained profile of the charging current and outputs the control signal for the purpose of controlling the charging current when the average differential limit temperature is exceeded by the differential temperature.

As an alternative or in addition, the control device 31 is adapted to compare the temperature of the first temperature measurement sensors 12 with one another after a predetermined time in which no charging process has been carried out by means of the charging system (interval in operation). During the interval in operation, the two power contacts 11 should match the temperature which is determined by the ambient temperature sensor 33. However, if it is established by means of the control device 31 at the end of the interval in operation that the temperatures of the two power contacts 11, which temperatures are ascertained by means of the two first temperature measurement sensors 12, excessively differ from one another, that is to say have a temperature difference which exceeds a predetermined temperature difference, it is highly probable that there is a fault in one of the two temperature measurement sensors 12. A simultaneous fault in both first temperature measurement sensors 12 is highly improbable. Therefore, self-monitoring of the charging system 1 is possible and it is possible to prevent faults in the first temperature measurement sensors 12 being interpreted as faults in the power contacts 11.

LIST OF REFERENCE SYMBOLS

1 Charging system
10 Charging plug
11 Current-carrying component/power contact
12 (First) temperature sensor
20 Charging cable
22 (Second) temperature sensor
30 Charging station
31 Electronic control device
32 Memory device
33 Ambient temperature sensor
34 Data line (between the electronic control device and the memory device)
40 Data line (between the electronic control device and the temperature sensor or ambient temperature sensor)

The invention claimed is:

1. A charging system for transmitting an electric charging current to an energy receiver, wherein the charging system comprises:
   a charging plug for coupling to a corresponding connecting apparatus;
   an electronic control device; and
   at least one temperature sensor for determining a temperature of a current-carrying component of the charging system, wherein the temperature sensor is coupled to the electronic control device for the purpose of outputting temperature measurement data which represents the temperature of the current-carrying component, wherein:

the charging system further has an ambient temperature sensor for determining an ambient temperature of the charging system;

the ambient temperature sensor is coupled to the electronic control device for the purpose of outputting ambient temperature measurement data which represents the ambient temperature of the charging system; and the electronic control device is designed to ascertain a differential temperature between the temperature of the current-carrying component and the ambient temperature based on the temperature measurement data and the ambient temperature measurement data and to output a control signal for the purpose of controlling the charging current based on the ascertained differential temperature, wherein the charging system further has a memory device which is connected to the electronic control device for the purpose of interchanging electronic data; and wherein the charging system further comprises a plurality of limit differential temperatures which are associated with different ambient temperatures in each case are stored in the memory device; and wherein the electronic control device is designed to compare the differential temperature with the limit differential temperature which is associated with the ascertained ambient temperature and to output the control signal for the purpose of controlling the charging current when the limit differential temperature is exceeded by the differential temperature.

2. The charging system as claimed in claim 1, wherein the electronic control device is designed to output a control signal for the purpose of controlling the charging current when a prespecified limit differential temperature is exceeded by the differential temperature.

3. The charging system as claimed in claim 2 wherein:

the electronic control device is designed to store a large number of differential temperature profiles, which are ascertained during charging processes, in the memory device, wherein the differential temperature profiles are each associated with an ambient temperature which is measured during the respective charging process and with a profile of the respective charging current;

the electronic control device is designed to ascertain average differential temperatures which are associated with respective ambient temperatures and respective charging current profiles based on the stored differential temperature profiles; and the electronic control device is designed to compare the differential temperature with the average differential temperature which is associated with the ascertained ambient temperature and the ascertained profile of the charging current, and to output the control signal for the purpose of controlling the charging current when the average limit differential temperature is exceeded by the differential temperature.

4. The charging system as claimed in claim 1 further comprising:

a setpoint time profile of the differential temperature which is associated with a time profile of the charging current is stored in the memory device; and wherein the electronic control device is designed to store a time profile of the differential temperature during a charging process;

the electronic control device is designed to compare the time profile of the differential temperature with the setpoint time profile of the differential temperature; and the electronic control device is designed to output the control signal for the purpose of controlling the charging current when the setpoint profile of the differential temperature is exceeded by the profile of the differential temperature by a prespecified amount.

5. The charging system as claimed in claim 1 further comprising:

a large number of setpoint time profiles of the differential temperature which are associated with different ambient temperatures in each case and with a time profile of the charging current in each case are stored in the memory device; and wherein the electronic control device is designed to store a time profile of the differential temperature during a charging process;

the electronic control device is designed to compare the time profile of the differential temperature with the setpoint time profile of the differential temperature which is associated with the ambient temperature; and the electronic control device is designed to output the control signal for the purpose of controlling the charging current when the setpoint profile of the differential temperature which is associated with the ambient temperature is exceeded by the profile of the differential temperature by a prespecified amount.

6. The charging system as claimed in claim 1 wherein the at least one current-carrying component is a power contact of the charging plug.

7. The charging system as claimed in claim 1 wherein the charging system has a charging cable with at least two charging lines which are arranged within the charging cable, wherein the at least one current-carrying component is a charging line of the charging cable.

8. The charging system as claimed in claim 1 wherein the ambient temperature sensor is arranged on an outer side of the charging plug.

9. The charging system as claimed in claim 1 wherein the charging system has a charging station which is electrically coupled to the charging plug, wherein the ambient temperature sensor is arranged on the charging station.

* * * * *